UNITED STATES PATENT OFFICE.

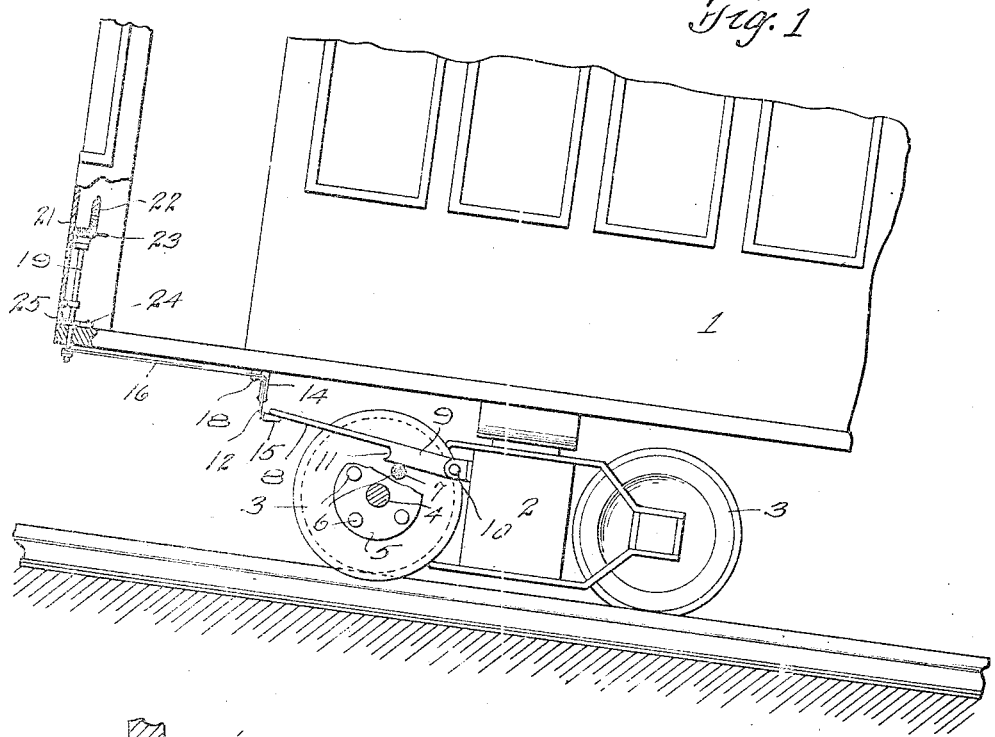
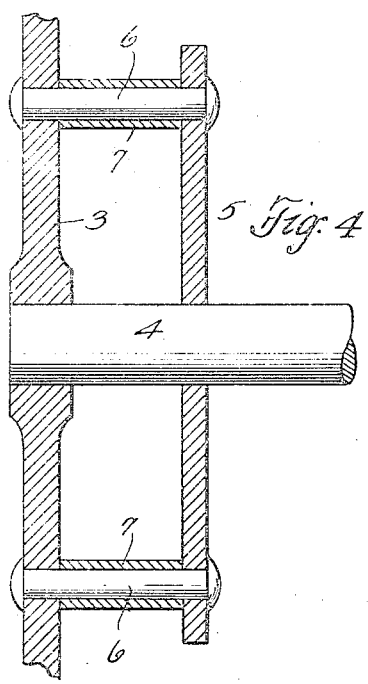
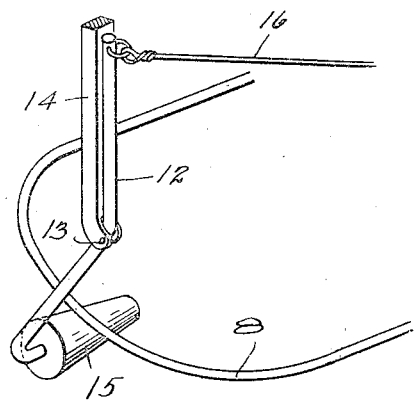

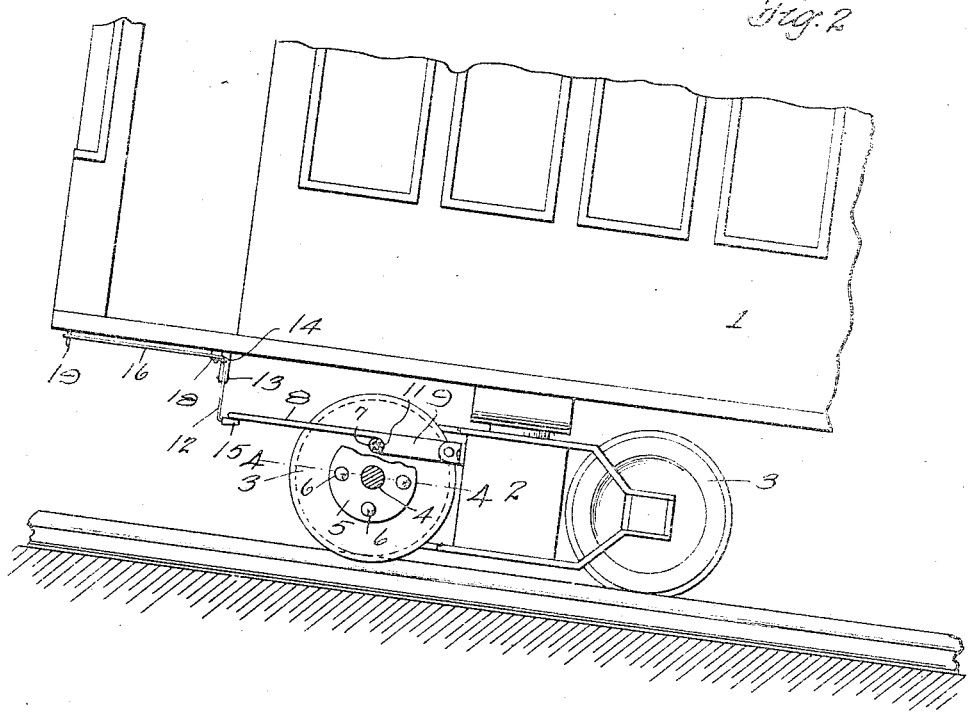

JOHN A. KOHL, OF CUYAHOGA FALLS, OHIO.

CAR STOP OR BRAKE.

1,252,589.  Specification of Letters Patent.  Patented Jan. 8, 1918.

Application filed September 12, 1917.  Serial No. 190,872.

*To all whom it may concern:*

Be it known that I, JOHN A. KOHL, a citizen of the United States, residing at Cuyahoga Falls, in the county of Summit and State of Ohio, have invented certain new and useful Improvements in Car Stops or Brakes, of which the following is a specification.

This invention relates to car stops or brakes, and has for its object to provide a device for preventing street cars or vehicles running away on heavy grades in the event that the ordinary brakes fail.

The invention is illustrated in the accompanying drawings, in which:

Figure 1 is a side elevation of a car, partly in section showing the device applied to the car and in inoperative position.

Fig. 2 is a similar view showing the device in operative position.

Fig. 3 is a plan view.

Fig. 4 is a section on the line 4—4 of Fig. 2.

Fig. 5 is a detail in perspective of a part of the device.

Referring to the drawings, 1 indicates the car body, 2 the truck bolster, 3 the wheels, and 4 the axle. To each of one pair of wheels is fixed a disk 5, secured to the wheels by bolts 6 and spacing sleeves 7 on the bolts. The disk 5 is also securely fastened to the axle 4 by any suitable means.

The stop device comprises a U shaped frame or bar 8 with thickened ends 9 pivoted to the bolster 2 at 10, and provided with notches 11. This pawl bar 8 is so positioned that it may be engaged with one of the sleeves 7 on each wheel to prevent the wheel turning in one direction.

The pawl bar may be swung up or down by means of a lever 12 pivoted at 13 to a depending bracket 14 under the floor of the car, the lower end of the lever being hooked under the bend of the bar 8 as shown in Fig. 5 and provided with a roller 15 on which the bar rides. One end of the rope 16 is fastened to the upper end of the lever 12 and passes over a guide roller 18 to connection with a shaft 19 which extends through the car floor. This shaft has a pinion 21 which meshes with a gear 22 provided with a handle 23 whereby it may be turned. A dog 24 is arranged to engage a ratchet 25 on the shaft 19 to prevent back slip of the shaft.

In operation the pawl bar is normally lifted so as to clear the sleeves 7, by winding the rope 16 on the shaft 19. When it is desired to apply the stop or brake, the dog 24 is disengaged, permitting the shaft 19 to turn and unwinding the rope and allowing the pawl bar to drop to position to catch one of the sleeves 7 in the notch 11, thereby locking the wheel and preventing down grade movement of the car.

The device may be quickly and easily operated and will serve to effectively prevent running away or wrecking of the car if the ordinary brakes fail to hold.

I claim:

1. The combination of a vehicle wheel, a disk beside the same, a bolt connecting the wheel and disk, a catch pivoted to the vehicle and arranged to drop to engage the bolt and stop the wheel, and means to hold the catch from such engagement.

2. The combination with a pair of vehicle wheels provided with lateral projections, of a U shaped pawl bar pivoted at its ends to the vehicle and extending beside the wheels and adapted to engage said projections, and means to hold said pawl bar out of such engagement.

3. The combination with a pair of vehicle wheels provided with lateral projections, of a U shaped pawl bar pivoted at its ends to the vehicle and extending beside the wheels and adapted to engage said projections, and means to hold said pawl bar out of such engagement, said means including a lever engaging under the bend of the U-bar and adapted to lift the same.

In testimony whereof, I do affix my signature in presence of two witnesses.

JOHN A. KOHL.

Witnesses:
 OTTO LEIST,
 C. A. DUFFY.

Copies of this patent may be obtained for five cents each, by addressing the "Commissioner of Patents, Washington, D. C."